United States Patent [19]

Schmidt

[11] Patent Number: 5,310,232
[45] Date of Patent: May 10, 1994

[54] VACUUM LIFTER

[75] Inventor: Adolf Schmidt, Duren, Fed. Rep. of Germany

[73] Assignee: Bartholomy & Co., Duren, Fed. Rep. of Germany

[21] Appl. No.: 89,596

[22] Filed: Jul. 12, 1993

Related U.S. Application Data

[63] Continuation of Ser. No. 764,681, Sep. 25, 1991, abandoned.

[30] Foreign Application Priority Data

Sep. 26, 1990 [DE] Fed. Rep. of Germany ....... 9013528

[51] Int. Cl.⁵ ............................................... B66C 1/02
[52] U.S. Cl. ..................................... 294/64.1; 294/907
[58] Field of Search ........................ 294/64.1, 64.2, 65, 294/907; 116/67 R, 68, 70; 414/627, 737, 752; 901/40

[56] References Cited

U.S. PATENT DOCUMENTS

| | | | |
|---|---|---|---|
| 2,887,849 | 5/1959 | Lytle | 294/64.1 |
| 2,895,504 | 7/1959 | Lederer | 116/70 X |
| 2,942,745 | 6/1960 | Horton | 294/64.1 X |
| 3,008,747 | 11/1961 | Lytle | 294/64.1 |
| 3,219,380 | 11/1965 | Carliss | 294/64.1 |
| 3,227,299 | 1/1966 | Draxler | 294/64.1 X |
| 3,260,391 | 7/1966 | Horton | 294/65 X |
| 3,372,822 | 3/1968 | Weinert | 294/64.1 X |
| 3,549,031 | 12/1970 | Blood et al. | 294/65 X |
| 4,509,891 | 4/1985 | Lipscomb | 294/64.1 X |
| 4,557,659 | 12/1985 | Scaglia | 294/65 X |
| 4,674,785 | 6/1987 | Riesenberg | 294/65 |

FOREIGN PATENT DOCUMENTS

| | | |
|---|---|---|
| 108725 | 9/1983 | European Pat. Off. . |
| 1152858 | 8/1963 | Fed. Rep. of Germany . |
| 2555823 | 6/1977 | Fed. Rep. of Germany ..... 294/64.1 |
| 3036272 | 5/1982 | Fed. Rep. of Germany . |
| 8435161 | 5/1985 | Fed. Rep. of Germany . |
| 2049096 | 3/1971 | France . |
| 2152957 | 4/1973 | France . |
| 923724 | 4/1963 | United Kingdom .................. 294/65 |
| 1028065 | 5/1966 | United Kingdom .................. 294/65 |

OTHER PUBLICATIONS

Föhnle et al, Bartholomy-Vakuum-Heber, 1985, 1–4.

Primary Examiner—Johnny D. Cherry
Attorney, Agent, or Firm—Joseph W. Berenato, III

[57] ABSTRACT

The invention concerns a vacuum lifter to transport loads with an adhesion surface and comprises at least one suction head with at least one projecting annular seal on its suction side, where the vacuum chamber(s) enclosed by the annular seal(s) is (are) hooked up to a main vacuum source and where additionally a battery-fed emergency vacuum source is provided which can be started by an emergency switch. In order to avert as much as possible crashes when using such a vacuum lifter, a pressure pickup (67) is associated with the or at least one of the vacuum chambers (13) and is coupled in such a way with a malfunction alarm (69) that when a preset limit pressure is exceeded during vacuum operation, the malfunction alarm (69) shall be turned ON.

18 Claims, 1 Drawing Sheet

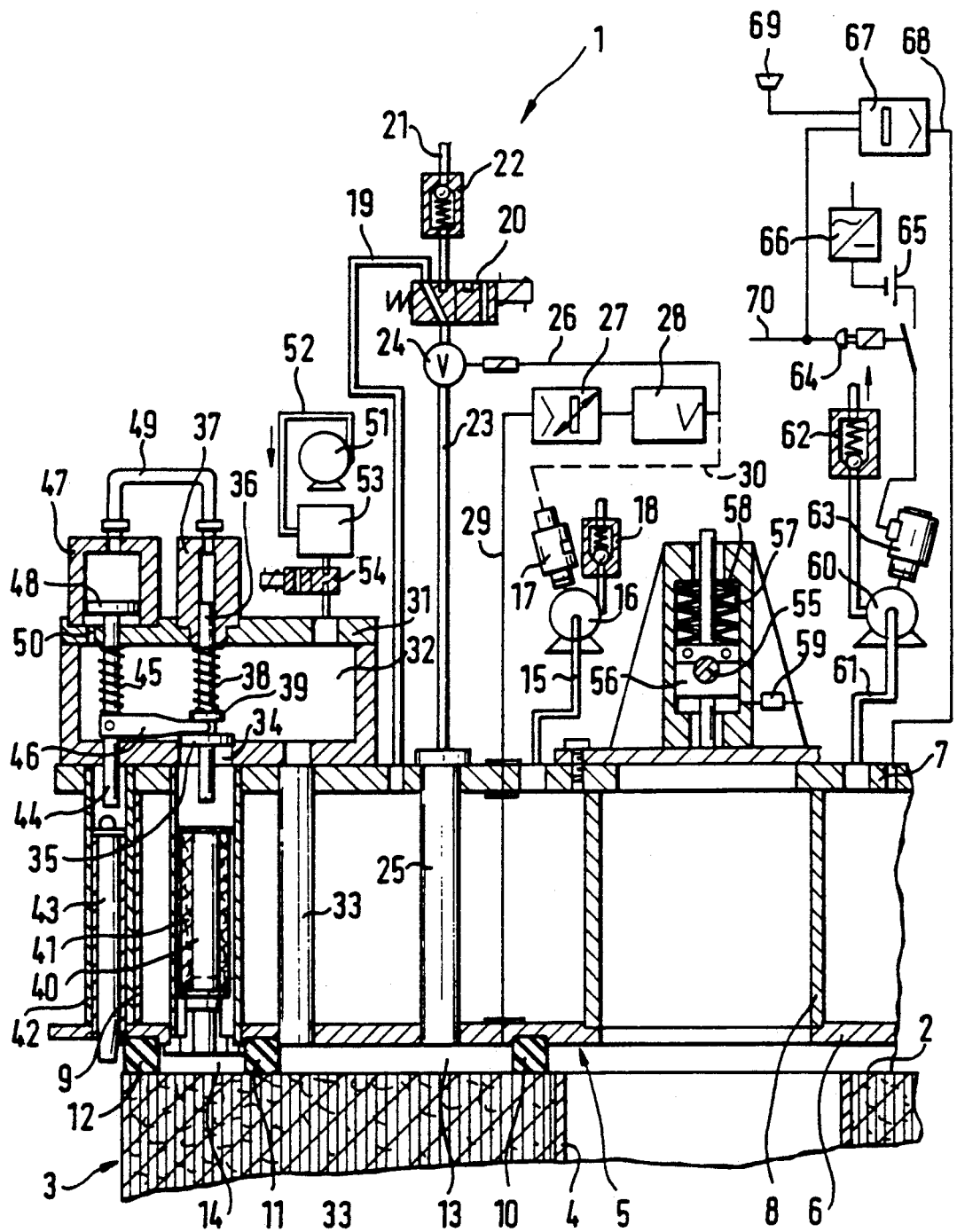

VACUUM LIFTER

This is a continuation of co-pending application Ser. No. 07/764,681, filed on Sep. 25, 1991, now abandoned.

FIELD OF THE INVENTION

The invention concerns a vacuum lifter to transport loads with an adhesion surface, comprising at least one suction head provided at its suction side with at least one projecting annular seal, the vacuum chamber(s) enclosed by the annular seal(s) communicating with a main vacuum source, an emergency battery-fed vacuum source also being present which can be made operational by an emergency switch.

As a rule, such vacuum lifters are meant to be mounted on cranes, though they are also for fork-lift type plant-floor conveyance equipment with lift masts, for manipulators, balancing equipment, roll turners or the like. Multiple arrays also are possible. By means of them, rolls of wound bands for instance of paper, metal, plastics or laminates, can be raised and moved—depending on the shape of the suction head—by being placed against the end face of the periphery of the upright or prone roll. Flat bodies, for instance slabs, also can be moved around by such vacuum lifters.

DESCRIPTION OF THE PRIOR ART

Illustratively, a vacuum lifter to this species is described in the German Gebrauchsmuster 84 35 161.6. It comprises a vacuum head in the form of a plane suction plate with several spaced, concentric annular seals mounted to its lower side. These annular seals form vacuum chambers they enclose and separate, and said chambers provide the sealed annular chambers, provided there be a cover, when the suction plate is deposited on the adhesion surface present for transport purposes. The annular seals need not be circular, but assume any other shape, for instance being oval or polygonal as long as they form a closed ring. Nor is it mandatory that they be one inside the other. They also may enclose adjacent vacuum chambers or be distributed over several suction plates. The vacuum chambers communicate through apertures in the suction plate with a main vacuum source, for instance a vacuum pump. A valve is associated in each vacuum chamber—at least in those vacuum chambers outside the innermost one—in the connection to the main vacuum source. Each valve is coupled to a sensor detecting the magnitude of the load's adhesion surface as the vacuum lifter is being lowered. The sensor is mounted in such a way that it opens the valve when the load's adhesion surface is so large that the associated vacuum chamber is completely closed during deposition on the adhesion surface.

In the article by E Faehnle & H Hanke, COMPUTERGESTEUERTES LAGERSYSTEM WOEHR MIT INTEGRIERTEM BARTHOLOMY-VAKUUM HEBER, in Wochenblatt fuer Papierfabrikation 113, 1985, #14, pp 523-5, a more developed vacuum is disclosed, which includes a DC battery driven emergency vacuum source besides the main vacuum source. This emergency vacuum source is so coupled to the ordinary power supply that it starts automatically when the power fails with the load being suspended. In this manner, crashing of the load during transporting is averted in case of power failure.

Nevertheless, the problem of accidental crashing of a load being transported was not solved completely. In spite of the operational main vacuum source, that is while power was being applied, crashes still occurred. Moreover, rolls that had been stored for a substantial length of time no longer could be reliably picked up.

SUMMARY OF THE INVENTION

The object of the invention is to so design a vacuum lifter of the initially cited kind that crashes are averted as much as possible and that reliable lifting of the load shall be assured.

This problem is solved by the invention by associating a pressure pickup with the vacuum chamber or at least one of the vacuum chambers, said pickup being coupled in such a way to a malfunction alarm that this alarm shall be turned ON when a preset limit pressure has been exceeded. In particular, optical or acoustic signal generators are applicable as malfunction alarms.

Alternatively or in combination with the above, the problem also may be solved by this invention in that a pickup is associated with the vacuum chamber or at least one of the vacuum chambers and is so coupled with the emergency switch that said switch automatically turns ON the emergency vacuum source when a preset pressure limit is exceeded in vacuum operation.

In the invention therefore any loss of vacuum and hence any loss of suction shall be detected so that when a limit pressure is crossed downward in vacuum operation, that is, with suspended load, either a malfunction signal is emitted, upon which the operator can respond by turning ON the emergency vacuum source, or the vacuum source can be turned ON automatically, the latter being the more reliable method. Both steps can be combined, whereby the operator reliably knows that the emergency vacuum source is operating. The invention makes it possible to prevent crashing even when the power is applied by switching on the emergency vacuum source and hence by increasing the suction.

This applies also already to lifting a load. It has been found, especially as regards paper rolls, that their air permeability increases on account of visco-elastic and hygroscopic behavior during storage and because of previous transportation phenomena, whereby the main vacuum source becomes overtaxed, that is, it cannot deliver sufficient adhesion. By furthermore switching on the emergency vacuum source, whether manually or automatically, loads that have become substantially air-permeable or already initially air-permeable can be transported and thereby the field of applications of the vacuum lifter has been broadened.

To implement the invention, the emergency vacuum source assumes such dimensions that for simultaneous operation of main and emergency vacuum sources, the vacuum produced by the main vacuum source alone shall be doubled.

It is furthermore suggested to provide the emergency vacuum with a remote control so that an operator, where called for independently of the automation, shall be able to intervene.

Lastly, the invention provides connecting the battery to a charginq apparatus in turn connected to the power in order to maintain the battery optimally charged.

DESCRIPTION OF THE PREFERRED EMBODIMENT

The invention is schematically illustrated by the vertical section of an embodiment. The FIGURE shows the left and middle parts (the right-hand part being omitted) of a vacuum lifter 1 resting on the top side 2 of an erect paper-roll 3 comprising an inside winding core 4. The paper web is wound on this core 4.

The main part of the vacuum lifter 1 is a vacuum vessel 5 which is circular in topview. This vacuum vessel is welded vacuum-tight and its lower closure is a suction plate 6, and its upper closure is a top plate 7. A central pipe 8 is inserted in the middle zone and forms the hook-up of the vacuum vessel 5. Outside, the vacuum vessel 5 is enclosed by a peripheral sidewall 9.

Three circular and complete elastomeric seals 10, 11, 12 are concentrically mounted relative to the central vertical axis of the vacuum lifter 1 at the lower side of the suction plate 6. By means of these circular seals 10, 11, 12, the vacuum lifter 1 is seated on the top side 2 of the paper-roll 3. The inner circular seal 10 is of such a large diameter that it is outside the winding core 4, whereby no spurious air can be aspirated through the winding core 4. Together with the further out middle annular seal 11, the inner annular seal 10 forms an annular, inner vacuum chamber 13. Together with the middle annular seal 11, the outer annular seal 12 forms another annular and outer vacuum chamber 14 separated by the middle annular seal 11 from the inner vacuum chamber 13. Provided the diameter of the vacuum lifter 1 be sufficiently larger, further vacuum chambers may be provided in similar manner.

The vacuum vessel 5 communicates through a vacuum line 15 with a vacuum source 16. The vacuum source 16 is connected to a tachometric control 17 and moreover includes a check valve 18. The vacuum source 16 maintains the vacuum vessel 5 serving as a reservoir to a constant reduced pressure.

A vacuum pipe 19 starts from the vacuum vessel 5 and leads to a three-way valve 20 which is driven electromagnetically. An outlet 21 equipped with a check valve 22 is connected to the three-way valve 20 and allows communication to the free atmosphere. Moreover a pipe 23 is connected, inside which there is a control valve 24 and which issues into a through pipe 25. The through-pipe 25 passes through the vacuum vessel 5 and is open toward the inner vacuum chamber 13.

The control valve 24 is connected through a control line 26 to a measurement transducer 27 cooperating with a pickup 28 which in turn is connected by a measurement line 29 passing through the vacuum vessel 5 to the inner vacuum chamber 13. Another control line 30 is shown in dashed lines and is connected to the tachometric control 17.

In the shown position of the three-way valve 20, the vacuum vessel 5 communicates through the vacuum pipe 19, the three-way valve 20, the pipe 23, the control valve 24 and the through-pipe 25 with the inner vacuum chamber 13. Accordingly, the vacuum vessel 5 is at full vacuum, this vacuum being set by the control valve 24 to a specific value detected by means of the measurement line 29, the pickup 28 and the measurement transducer 27 and fed to the control valve 24 as a control value. The vacuum is further regulated by the tachometric control 17.

If the vacuum in the inner vacuum chamber 13 must be eliminated, then the three-way valve 20 will be switched. In this manner the pipe 23, the through-pipe 25 and therefore the inner vacuum chamber 13 are made to communicate through the check valve 22 with the atmosphere, that is, the inner vacuum chamber 13 is vented. At the same time, the previously extant communication between the vacuum line 15 and the pipe 23 is interrupted, that is, the vacuum in the vacuum vessel 5 is maintained.

Outside, a hollow vacuum housing 31 is mounted on the top plate 7 of the vacuum vessel 5. The inside space 32 of said housing communicates by a through-pipe 33 crossing the vacuum vessel 5 with the inner vacuum chamber 13, i.e., the inside space 32 is at the same pressure as in the inner vacuum chamber 13.

The vacuum housing 31 comprises at its lower side a valve aperture 34 cooperating with a valve head 35. The valve head 35 is seated on a hollow valve rod 36 and is open at the top and bottom. The valve rod 36 is received by its upper end in a valve-rod guide 37. Another valve-rod guide not shown here in further detail is present in the lower end zone of the valve rod 36. In the zone of the inside space 32, the valve rod 36 is enclosed by a compressing helical spring 38 resting at the top side against the valve-rod guide 37 and at the bottom side against a collar 39 above the valve head 35. Accordingly, the valve head 35 is loaded by the compression spring toward the valve aperture 34.

The valve aperture 34 continues downward into a filter pipe 40 passing through the vacuum vessel 5 and issuing in the outer vacuum chamber 14. A filter inset 41 is mounted in the filter pipe 40 and can pass the suction air from the outer vacuum chamber 14 when the valve head 35 is raised off the valve aperture 34.

A guide pipe 42 is mounted outside on the sidewall 9 of the vacuum vessel 5 and holds in relatively loose manner a vertically displaceable sensor pin 43. Said pin is located tightly against the outside of the outer annular seal 12.

An actuation rod 44 is supported in vacuum-tight manner above and in the axial extension of the sensor pin 43 in the lower and upper walls of the vacuum housing 31. Said rod 44 is surrounded in the zone of the inside space 32 of the vacuum housing 31 by a helical compression spring 45 generating the same spring force as the helical spring 38 of the valve rod 36. The helical spring 45 rests against the top wall of the vacuum housing 31 and at the bottom against a fork-lever 46 rigidly affixed to the actuation rod 44. The fork-lever 46 extends horizontally as far as the valve rod 36 where it engages between the collar 39 and the valve head 35 in geometrically locking manner. In this manner the valve head 35 follows the motions of the actuation rod 44.

At the top, the actuation rod 44 projects out of the vacuum housing 31 and into a balancing cylinder 47 where it comprises at its end a balancing piston 48 displaced in sealed manner in the balancing cylinder 47, the piston surface corresponding to that of the valve head 35. The space above the balancing piston 48 communicates through a balancing line 49 with the valve-rod guide 37. The space below the balancing piston 48 communicates through a balancing borehole 50 with the inside space 32 of the vacuum housing 31.

Regarding large vacuum lifters with additional, outer vacuum chambers, each vacuum chamber comprises a predetermined array, the particular vacuum housings communicating with the particular next inner vacuum chambers.

In the position shown, the sensor pin 43 is in its lowermost position because the diameter of the paper roll 3 precisely coincides with the outside diameter of the outer annular seal 12. When the vacuum lifter 1 is deposited on the paper roll 3, the valve head 35 accordingly is not raised. In the process the vacuum forces acting on the valve head 35 in the direction of opening balance on account of the vacuum in the inside space 32 with the vacuum forces acting through the balancing borehole 50 on the lower side of the balancing piston 48 because of the essentially coinciding diameters of the valve head 35 and the balancing piston 48, that is, the actuation rod 44 and hence the fork-lever 46 are pressed down by a force corresponding to that which is exerted on the valve head 35 in the direction of opening. Because of this balance, the valve head 35 is forced merely by the helical springs 38, 45 onto the valve aperture 34.

As a rule, the diameter of the paper roll 3 does not coincide, as shown, with the outside diameter of the outer annular seal 12. If the diameter is larger, the sensor pin 43 will be left unactuated when the vacuum lifter 1 is being deposited, because said pin projects less downward than the annular seals 10, 11, 12 even when these are somewhat compressed by the weight of the vacuum lifter 1. Only when the three-way valve 20 has been moved into the position shown and hence the vacuum chamber 13 is at full vacuum will the annular seals 10, 11, 12 be compressed so much that the sensor pin 43 comes to rest against the upper side of the paper roll and even is forced upward. In that process, said pin also spans the distance between its upper end and the lower end of the actuation rod 44 which it drives along.

Thereupon, the valve head 35 is raised by the fork lever 46 from the valve aperture 34 against the action of the helical springs 38, 45. The outer vacuum chamber 14 is also evacuated in this manner through the filter pipe 40, valve aperture 34, vacuum housing 31 and through-pipe 33. By raising the valve head 35, a pressure balance takes place at its top and bottom sides, whereby, in the absence of other steps, the vacuum operating at the lower side of the balancing piston 48 would press downward again the actuation rod 44 and hence the valve rod 36. However, the valve rod 36 being hollow and there being communication with the balancing cylinder 47 through the balancing line 49, the space above the balancing piston 48 also is evacuated, whereby the initial pressure difference is eliminated.

After the paper roll 3 has been deposited, the inside vacuum chamber 13 is vented by actuating the three-way valve 20—in the manner already described above. This venting however also affects the inside space 32 of the vacuum housing 31 and hence the outside vacuum chamber 14 because the valve head 35 is still open. When the vacuum lifter 1 is raised, the sensor pin 43 again moves out of its guide tube 42 and the valve head 35 and the actuation rod 44 descend again on account of the actions of the helical springs 38 and 45 until the valve head 35 has again sealed the valve aperture 34.

The above described situation presumes that the diameter of the paper roll 3 is larger than shown, whereby the sensor pin 43 is raised in the process of deposition. This is not the case in the present embodiment, and accordingly the sensor pin 43 remains in its downward projecting position. As a consequence, the valve aperture 34 remains closed even though the outer vacuum chamber 14 is sealed by the top side 2 of the paper roll 3 and might be evacuated. However, the inner vacuum chamber 13 is so dimensioned in surface that in such cases its suction suffices to lift the paper roll 3 and to transport it suspended, whereby there is no need for applying the vacuum to the outer vacuum chamber 14 in such instances. When depositing and then raising the vacuum lifter 1, the problem does however arise that by the elastic behavior of the annular seals 11, 12 a vacuum is produced in the outer vacuum chamber 14 because here, contrary to the vented inner vacuum chamber 13, no air can follow. It is possible as a result that the paper roll 3 can be carried along some distance when the vacuum lifter 1 is being raised, until the vacuum formed in the outer vacuum chamber is eliminated by air slowly seeping through the material of the paper roll 3 to such an extent that the paper roll 3 no longer can be carried. Thereupon, it crashes randomly.

A compressed-air generator 51 is provided to avert such eventualities and it communicates through a compressed-air line 52 with a compressed-air reservoir 53 and it is connected through a solenoid valve 54 to the inside space 32 of the vacuum housing 31. As a rule, the solenoid valve 54 is closed. Following deposition of the paper roll 3 and switching of the three-way valve into the venting position, the solenoid valve 54 is opened by an automatic control means not shown here in further detail once the pressure in the vacuum chamber 13 has risen to nearly atmospheric. As a result, the inside space 32 of the vacuum housing 31 is raised to excess pressure and thereby, by means of the through-pipe 33, the inner vacuum chamber 13. The check valve 22 prevents the air from flowing away through the pipe 23 and the three-way valve 20 in its venting position. The excess pressure building up in the inner vacuum chamber 13 suffices to raise the vacuum lifter 1 off the paper roll 3 and to overcome the suction forming in the process in the outer vacuum chamber 14 on account of the elastic behavior of the annular seals 11, 12. As a result, the paper roll 3 no longer is unwittingly carried along. The supply of compressed air is stopped at once when the vacuum lifter 1 has been raised on account of the automatic control by pressure sensors.

Though not shown herein in further detail, the vacuum lifter 1 is centrally suspended from a crane travel works of which the lower pulley is connected to a support bolt 55 displaceably held by slide blocks 56 in a vertical guide 57. The support bolt 55 widens at the lower side and rests thereby against a disk spring 58. A limit switch 59 is mounted in the lower part of the vertical guide 57 and will be actuated when the slide blocks 56 reach their lower end position. The limit switch 59 is connected by a control not shown in further detail to the three-way valve 20.

When the paper roll 3 is being deposited, the crane travel works goes slack whereby the slide blocks 56 together with the support bolt 55 are lowered. Upon actuation of the limit switch 59, the three-way valve 20 is switched from the shown position, wherein the inner vacuum chamber 13 is at vacuum, into the venting position, so that the inner vacuum chamber 13 automatically communicates with the atmosphere. Another limit switch not shown in further detail is connected to the crane travel works as a slack-cable securing means and will automatically turn it off. Additionally, the limit switch 59 may also be connected to the solenoid valve 54 of the compressed-air generator 51, whereby simultaneously the inner vacuum chamber 13 shall not only be vented but also be supplied with compressed air. Thereupon, the vacuum lifter 1 may be raised off the paper roll 3.

A control means assures that when the slide blocks 56 leave the limit switch 59, the three-way valve 20 shall not be switched, rather that this switching shall take place only upon renewed lowering of the vacuum lifter 1 onto another paper roll and hence a descent of the slide blocks 56 onto the limit switch 59. However, a different logic circuit also may be provided, for instance, to make possible resetting the three-way valve into the vacuum position only by means of the operator.

Additionally, the vacuum lifter 1 includes an emergency vacuum source 60 communicating through an emergency vacuum line 61 with the inside of the vacuum vessel 5. The emergency vacuum source 60 also is secured by a check valve 62. The emergency vacuum source 60 is driven by a DC motor 63 connected through a pressure switch 64 with a battery 65. The battery 65 is connected in turn to a battery charger 66 constantly under power and in this manner is maintained at optimum charge.

The pressure switch 64 is connected with a measurement pickup 67 in turn connected through a measurement line 68 to the inside of the vacuum vessel 5. The measurement transducer 67 is set in such a way that it shall emit a closing pulse to the pressure switch 64 designed as a magnetic switch when there is detection through the measurement line 68 that the vacuum in the vacuum vessel 5 has dropped below a given minimum value. As a result, the DC motor 63 and hence the emergency vacuum source 60 will be started, whereby the drop in vacuum in the vacuum vessel 5 is compensated and the normal vacuum level is reached again. At the same time, a malfunction alarm is emitted through a signal generator 69 to ensure the operator is aware that the vacuum produced by the vacuum source 16 is insufficient to transport the paper roll 3.

A remote control line 70 also starts from the pressure switch so that an operator thereby can actuate this pressure switch 64 independently from or alternatively to the above described automation and thereby can start the emergency vacuum source 60.

Illustratively, a drop in vacuum can arise by failure of the vacuum source 16 or also because the vacuum gripping ability on a paper roll 3 was so degraded with time on account of its visco-elastic and hygroscopic behavior that the vacuum source 16 no longer suffices in making a vacuum. In that case, the emergency vacuum source 60 will be a reinforcing means. Additionally, the emergency vacuum source 60 also may be turned ON when deemed necessary by an operator.

Moreover, "vacuum" in the sense of this description denotes a pressure less than atmospheric.

I claim:
1. A vacuum lifter, comprising:
a) a suction plate assembly;
b) at least first and second seals projecting from sid assembly and defining therebetween a vacuum chamber;
c) a main vacuum source operatively associated with said assembly for applying a vacuum to said vacuum chamber;
d) an emergency vacuum source operatively associated with said assembly for selectively applying a vacuum to said vacuum chamber, said emergency vacuum source being electrically operable during application of the vacuum thereof;
e) means operatively associated with said vacuum chamber for monitoring the vacuum therein; and
f) means operatively associated with said monitoring means and with said emergency vacuum source for causing automatic electrical operation of said emergency vacuum source when said monitoring means detects in said vacuum chamber a vacuum pressure less than a preselected limit.
2. The lifter of claim 1, wherein:
a) said monitoring means includes a pressure pickup.
3. The lifter of claim 1, wherein:
a) said causing means includes a remotely operable switch.
4. The lifter of claim 1, wherein:
a) said causing means includes means for permitting operation of said emergency vacuum source when the vacuum in said vacuum chamber is less than said preselected limit so that said main and emergency vacuum sources may operate simultaneously for thereby causing the vacuum in said vacuum chamber to be twice the vacuum applied solely by said main vacuum source.
5. The lifter of claim 1, wherein:
a) said emergency vacuum source includes a battery for assuring operation thereof.
6. The lifter of claim 1, wherein:
a) each of said seals is resilient.
7. The lifter of claim 1, wherein said assembly includes:
a) a vacuum vessel comprising a closed body having a top plate and a bottom plate;
b) each of said seals extends from said bottom plate;
c) said main and emergency vacuum sources apply a vacuum to the interior of said vessel; and
d) means extend from the interior of said vessel to said vacuum chamber for applying the vacuum in said vessel 6 to said vacuum chamber.
8. The lifter of claim 7, wherein:
a) said applying means includes a valve assembly for controlling the application of vacuum to said vacuum chamber so that said vacuum chamber may be vented to atmosphere without venting said vessel.
9. The lifter of claim 8, wherein:
a) said valve assembly includes a three way valve and a check valve.
10. The lifter of claim 7, wherein:
a) said applying means includes a through pipe extending through said vessel and communicating with said chamber; and
b) a vacuum pipe extends from the interior of said vessel and communicates with said through pipe.
11. The lifter in claim 7, wherein:
a) a central pipe extends between said plates; and
b) an aperture in said bottom plate is aligned with said central pipe so that said central pipe is open to the atmosphere.
12. A vacuum lifter, comprising:
a) a vacuum vessel comprising upper and lower plates and a peripheral wall extending therebetween;
b) at least first and second resilient seals extending from and about said lower plate for defining therebetween a vacuum chamber;
c) a main vacuum source and an emergency vacuum source, each of said sources communicating with the interior of said vessel for applying a vacuum thereto, wherein said emergency vacuum source is electrically operable during application of the vacuum thereof;
d) a measurement pick-up operatively associated with said vessel for monitoring the vacuum therein;
e) a vacuum supply extending between said vessel and said chamber for causing the vacuum inside said vessel to be selectively applied to said chamber; and
f) control means operatively associated with said emergency vacuum source and said pick-up for causing automatic electrical operation of said emergency vacuum source when said monitoring means detects in said vacuum chamber a vacuum pressure less than a preselected limit.

13. The lifter of claim 12, wherein said vacuum supply system includes:
   a) an aperture in said upper plate;
   b) a through pipe extending through said vessel and communicating with said chamber; and
   c) a vacuum pipe interconnecting said aperture and said through pipe.

14. The lifter of claim 13, wherein:
   a) a valve assembly is interposed in said vacuum pipe for permitting said through pipe and thereby said chamber to vent to atmosphere while maintaining the vacuum in said vessel.

15. The lifter of claim 12, wherein:
   a) said control means includes a remotely operable switch for causing operation of said emergency vacuum source.

16. The lifter of claim 15, wherein:
   a) said switch is operable when the vacuum in said vessel is less than said preselected limit so that said main and emergency vacuum sources may operate simultaneously.

17. The lifter of claim 12, wherein:
   a) said emergency vacuum source includes an electrically operable motor; and
   b) a battery is operably associated with said motor for assuring operation thereof.

18. The lifter of claim 12, wherein:
   a) each of said seals is resilient.

* * * * *